Feb. 19, 1946.   P. H. SCHLOSSER ET AL   2,395,015
CUPRAMMONIUM PROCESS
Filed Aug. 27, 1940
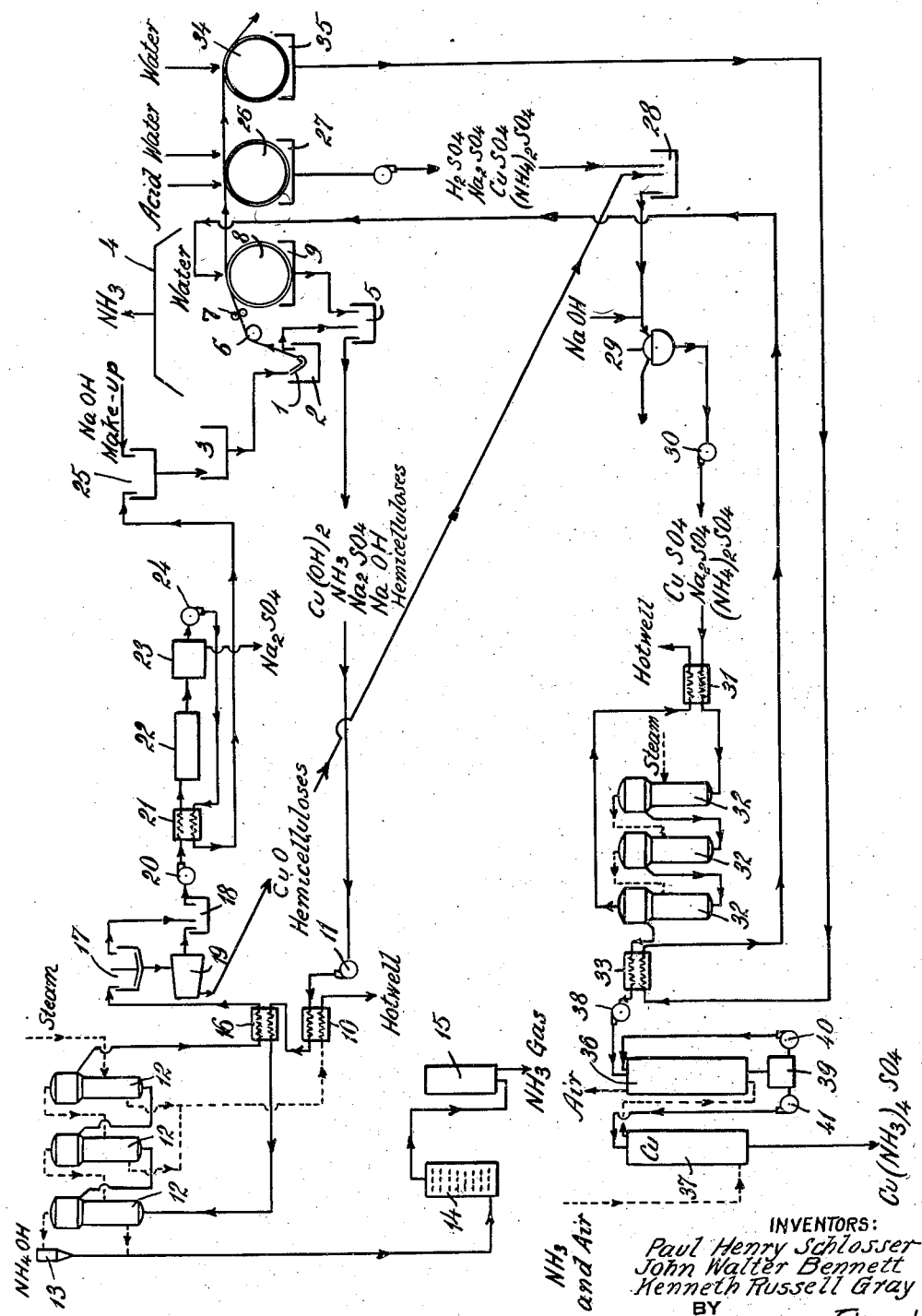
INVENTORS:
Paul Henry Schlosser
John Walter Bennett
Kenneth Russell Gray
BY
Pennie, Davis, Marvin & Edmonds
ATTORNEYS Patented Feb. 19, 1946

2,395,015

UNITED STATES PATENT OFFICE 2,395,015

CUPRAMMONIUM PROCESS

Paul Henry Schlosser, John Walter Bennett, and Kenneth Russell Gray, Shelton, Wash., assignors to Rayonier Incorporated, Shelton, Wash., a corporation of Delaware Application August 27, 1940, Serial No. 354,392

21 Claims. (Cl. 18—54)

This invention relates to the cuprammonium process for the manufacture of rayon, staple fiber, transparent films and the like. More particularly, the invention is concerned with the recovery of reagents employed in the cuprammonium process and has for its object the provision of certain improvements in reagent recovery.

In the cuprammonium process, a cuprammonium-cellulose solution is introduced, e. g. spun, into an appropriate setting bath, e. g. of sodium hydroxide, to form a regenerated cellulose product, and the resulting product is then successively washed with water, dilute sulphuric acid and again with water. Economic practice of the process requires economic recovery of the various chemical agents employed, such as ammonia, copper, sodium hydroxide etc. The present invention provides an especially efficient system for the recovery of such chemical agents, and while the invention is particularly adapted for processes in which a regenerating or setting bath of sodium hydroxide is used, it may be advantageously applied to processes in which setting baths of water, inorganic salts etc. are used.

In accordance with one aspect of the invention, the initial or first wash water liquor is mixed with spent spinning bath, and the resulting mixture is heated, as for example in a multiple effect evaporator, to drive off ammonia and to form copper oxide. With a sodium hydroxide setting bath, the copper oxide is formed in a solution of sodium hydroxide. Any cellulosic impurity in the spent setting bath is removed along with the copper oxide when the latter is separated from the sodium hydroxide solution. The sodium hydroxide solution is preferably cooled to a sufficiently low temperature to crystallize sodium sulphate therefrom, and after removal of the crystallized sodium sulphate the sodium hydroxide is utilized for the preparation of fresh setting bath.

In accordance with another aspect of the invention, the composition of the acid wash liquor is adjusted to neutralize any free acid and so that all of the copper present is in the form of copper sulphate, and the copper sulphate is recovered as such or converted to copper tetrammino sulphate for reuse in preparing fresh cuprammonium-cellulose solution. In the preferred practice of the invention, the copper oxide recovered from the mixture of spent spinning bath and water wash liquor is mixed with the acid wash liquor in the presence of sufficient sulphuric acid to convert all of the copper present to copper sulphate. Any cellulosic impurity (hemicelluloses) associated with the recovered copper oxide may now be advantageously removed by filtering or the like. The solution of copper sulphate is preferably heated, as for example in a multiple effect evaporator, to drive off water vapor and to increase the copper sulphate content of the residual solution. Preferably, the copper sulphate is reacted with ammonia, recovered from the process, to form copper tetrammino sulphate. This is advantageously accomplished in a two-stage process in the first stage of which basic copper sulphate and ammonium sulphate are formed and in the second stage of which the products formed in the first stage are converted to copper tetrammino sulphate in the presence of sufficient metallic copper to convert only that amount of ammonium sulphate as was originally present in the acid wash liquor to copper tetrammino sulphate, a reaction that readily takes place in the presence of ammonia and oxygen (air).

According to a still further aspect of the invention, the final water wash liquor is passed in heat-exchange relationship with the hot concentrated copper sulphate solution, and the so-heated final water wash liquor is used for the initial or first hot water wash of the regenerated cellulose product. Other novel and advantageous features of the invention will be hereinafter pointed out.

For the purposes of illustration, it will be assumed that the regenerated cellulose product is formed from a cuprammonium-cellulose solution prepared in accordance with the principles described in the patent of Messrs. Schlosser and Gray, No. 2,296,578. The procedure employed in preparing the cuprammonium-cellulose solution will influence the quantities of the various chemical agents that it is proposed to recover, and may in some cases slightly change the point at which these agents are recovered, but such changes are within the contemplation of the invention. Similarly, for purposes of illustration, it will be assumed that the setting bath is the customary sodium hydroxide solution. The invention will now be described in its complete and preferred form in connection with the single figure of the accompanying drawing, which is a diagrammatic flow sheet of the complete recovery system for a cuprammonium process plant for spinning rayon filaments or thread.

The cuprammonium-cellulose solution contains, in addition to cellulose, copper, ammonia and sodium sulphate, the sodium sulphate being formed in the solution by the reaction of sodium hydroxide with the sulphate radical of copper tetrammino sulphate (cupric tetrammonio sulphate). If in the production of regenerated cellulose products from such a solution, substantially all of the copper and ammonia can be recovered for reuse in the preparation of fresh cuprammonium-cellulose solution, and if the sodium sulphate, a marketable product, can be recovered, the chemical reagent cost of producing such regenerated cellulose products is materially reduced. The present invention successfully accomplishes this end, and, in its complete and preferred form, can be carried out in a simple and efficient manner and with a minimum of treatment steps and equipment.

Referring now to the flow sheet of the drawing, the cuprammonium-cellulose spinning solution is extruded or spun from a spinerette 1 into a coagulating or setting bath 2 in the conventional manner. A sodium hydroxide setting solution is supplied to the bath 2 at a constant rate of flow from a constant level tank 3. The composition of the setting bath may be varied in accordance with the type of yarn desired without influencing the recovery system, and any desired composition of setting bath may be accurately maintained as hereinafter more particularly explained.

The spinning solution on entering the setting bath gives up a portion of its copper and ammonia as a copper ammonia complex, and also gives up sodium sulphate and free ammonia, a part of this free ammonia remaining in solution while the balance escapes and is drawn away from the spinning area by means of an appropriate exhaust system 4. In addition to receiving the aforementioned chemicals from the spinning solution, the setting bath undergoes other changes. Thus, there is a loss in sodium hydroxide due to the fact that some adheres to the regenerated cellulose product as it leaves the bath, and there is some dilution of the bath due to the presence of a large amount of water in the spinning solution. The setting bath is therefore constantly replenished from the tank 3, while spent spinning bath constantly overflows and collects in tank 5. Thus the setting bath is in constant circulation and the chemical agents taken up by the bath are promptly carried away in the spent bath.

The regenerated cellulose product, e. g. filament or thread, upon leaving the bath, carries with it some sodium hydroxide, the major portion of the copper originally present in the spinning solution, ammonia and sodium sulphate. The regenerated cellulose containing these chemicals is therefore preferably passed over suitable reels or rollers 6 and between a pair of press rolls 7 where a considerable part of the adhering liquid is removed. The liquid so removed carries with it a portion of the aforementioned chemicals and may be collected in the tank 5. The regenerated cellulose product then passes to suitable reels or drums 8 where it is given a water wash, preferably with warm or hot water.

The temperature of the water wash is governed by the desired characteristics of the regenerated cellulose product. It is advisable to use a countercurrent system in washing in order to better remove the chemicals to be recovered and to minimize the amount of sodium hydroxide carried along to the acid wash stage. However, this countercurrent washing system is not essential although it does result in greater economy of operation. In the course of the water washing operation, ammonia is removed from the regenerated cellulose product, some escaping into the area over the reels or rolls 6 and being caught and removed by the exhaust system 4 while the balance is carried away in the water wash liquor. The copper associated with the regenerated cellulose product is converted by the water wash to copper hydroxide and that portion not closely bound with the cellulose is washed out. In addition the water wash liquor contains a part of the sodium hydroxide and a part of the sodium sulphate associated with the initially formed regenerated cellulose product. The exhaust water wash liquor is caught in a trap or tray 9 and conveyed to the tank 5 where it mixes with the spent setting bath.

Before following the regenerated cellulose product through its next treatment stages, the treatment of the mixed liquors collecting in the tank 5 will be described. The mixing of the waste or spent setting bath and waste water wash liquor produces a resultant liquor containing copper as copper hydroxide, copper in a copper ammonia complex, dissolved ammonia, sodium sulphate, sodium hydroxide and a small quantity of hemicelluloses. This liquor is first passed through a heat-exchanger 10, as for example by a pump 11, and is then conveyed to the first unit of a multiple effect evaporator 12. Evaporation is most economically carried out in a multiple effect evaporator, although the use of such equipment is not necessary for the accomplishment of the desired results. In the drawing, a triple effect evaporator is shown with the heat employed being applied in countercurrent to the liquor flow. The purpose of such a system is to increase the efficiency of the different stages. The liquor entering the first unit of the evaporator is high in ammonia, a non-condensable gas at evaporating temperatures. If the vapor from this unit were to be employed as the heating medium in the second unit a high film factor would exist in the steam chest of the second unit and the efficiency would be materially reduced.

In the first unit of the evaporator 12, the major portion of the dissolved ammonia is driven off together with a predetermined quantity of water vapor. The vapor mixture passes to a condenser 13. If an ammonia solution of higher concentration than collected in the condenser 13 is desired, further concentration of the solution may be effected in the still 14 and ammonia tower 15. That portion of the ammonia gas not dissolved in the tower 15 passes from the tower and is collected in any appropriate manner for use in making up fresh cuprammonium-cellulose solution.

As previously mentioned, the mixed liquor from the tank 5 contains hemicelluloses. These hemicelluloses are in the form of copper cellulose complexes which are soluble in alkaline solutions in the presence of ammonia. When the major portion of the ammonia is driven off in the first unit of the evaporator 12, the copper cellulose complexes are precipitated. In the first unit of the evaporator, copper in the form of copper hydroxide is converted by heating to copper oxide. The copper in its several forms passes with the partially concentrated liquor from the first to the second unit of the evaporator. In the second unit of the evaporator additional concentrating and ammonia removal are accomplished, and the ammoniacal vapor from the second unit is used as the heating medium for the first unit. The condensate from the steam or heating chest of the first unit of the evaporator therefore contains ammonia which if in sufficient concentration may be recovered and concentrated in the still 14 and tower 15.

The liquor together with the precipitated copper passes from the second to the third unit of the evaporator where further concentration of the liquor is effected. The total quantity of water evaporated from the liquor in the three units of the evaporator will be of sufficient amount to give any predetermined sodium hydroxide concentration most suitable for the setting bath. The vapor from the third unit of the evaporator is employed as the heating medium for the second unit, so that fresh steam from the boilers or other suitable source is supplied only to the third unit. The concentrated liquor leaving the third unit of the evaporator consists of a solution of sodium hydroxide and sodium sulphate with copper oxide and copper cellulose complexes in suspension. There may also be present in the liquor, depending on the conditions maintained, some copper and traces of ammonia in solution, but the presence of these substances does not in any way affect the operation or efficiency of the recovery system.

The concentrated liquor from the evaporator 12 passes through a heat-exchanger 16 to a thickener or settling tank 17. The mixed liquor from the tank 5 passes through the heat-exchangers 10 and 16 on its way to the evaporator 12, in heat-exchange relationship in the heat-exchanger 10 with the exhaust or condensed heating medium from the heating chests of the second and third units of the evaporator, and in heat-exchange relationship in the heat-exchanger 16 with the hot concentrated liquor from the evaporator. From the heat-exchanger 10, the condensed heating medium may pass to a hot well or the like. In the thickener or settling tank 17, the concentrated liquor is subjected to sedimentation and decantation in the course of which there is produced a copper oxide sludge and a sodium hydroxide effluent. The sodium hydroxide effluent flows to a tank 18, and the copper oxide sludge is dehydrated in a continuous centrifuge or filter 19, the liquor removed in the centrifuge or filter passing to the tank 18.

The liquor collecting in the tank 18 is a relatively concentrated solution of sodium hydroxide and sodium sulphate substantially free of copper. From the tank 18 the liquor is conveyed by a pump 20 through a heat-exchanger 21 to a chiller 22 where the temperature of the liquor is rapidly lowered. The chilled liquor passes to a dehydrator 23 where sodium sulphate crystallizes out of the liquor and the resulting crystals are removed. The sodium hydroxide concentration of the solution or liquor leaving the dehydrator 23 is governed by the amount of evaporation taking place in the evaporator 12 and the sodium sulphate concentration is governed by the temperature at which the solution leaves the chiller 22. The solution leaving the dehydrator 23 is always saturated with sodium sulphate, so that the amount of sodium sulphate in the solution is dependent upon the temperature prevailing during the crystallization and removal of sodium sulphate in the chiller 22 and dehydrator 23. Accordingly, the solution leaving the dehydrator 23 is of a definite composition both as to the sodium hydroxide and sodium sulphate content. The relative amounts of these chemicals can be varied at will so as to suit processing and recovery requirements. From the dehydrator 23 the solution is passed by a pump 24 through the heat-exchanger 21 to a make-up or surge tank 25. In the heat-exchanger 21 the solution from the dehydrator 23 is in heat-exchange relationship with the liquor passing from the tank 18 to the chiller 22.

Make-up sodium hydroxide, to compensate for any losses in the system, is made to the tank 25 from a suitable source of fresh sodium hydroxide. The sodium hydroxide make-up may be added automatically by equipping the tank 21 with a float valve or the like. From the make-up tank 25, the solution passes to the constant level tank 3 to furnish fresh setting bath.

Reverting now to the spinning section, the regenerated cellulose product after washing with water on the reels or drums 8 passes on to suitable devices for treatment with dilute sulphuric acid. When spinning thread, as shown in the drawing, the sulphuric acid treatment is carried out, preferably in a countercurrent manner, on a reel or drum 26 which may, for example, by a revolving cagelike structure consisting of a multiplicity of bars, blades or the like mounted for radial in-and-out and longitudinal back-and-forth movement so as to advance the thread in helical fashion along the cage. The thread may also be passed to a standard spinning pot, instead of a reel or drum, although this is not the preferred practice since certain economies such as countercurrent flow between liquid and thread are lost. In making transparent films and the like, the films are passed over a series of rollers immersed in adjacent troughs. The troughs are so arranged that the acid leaving one flows to the next adjacent trough with the direction of acid flow being opposite to that of the direction of travel of the film. Whatever device is used for the acid treatment, the acid wash liquor at the last step or stage of the acid treatment, which is the first point or stage at which acid is applied to the regenerated cellulose product, contains sodium sulphate, copper sulphate, sulphuric acid and a small quantity of ammonium sulphate.

The amount of sulphuric acid used in treating or washing the regenerated cellulose product should be sufficient to convert all of the sodium hydroxide carried over by the product to sodium sulphate and to convert the ammonia to ammonium sulphate and the copper to copper sulphate. In addition, an excess of sulphuric acid should be used, or else added to the acid wash liquor, sufficient to react and form copper sulphate with an amount of copper equivalent to the copper removed from the regenerated cellulose product prior to the acid treatment or washing. For example, if 45% of the copper is recovered from the regenerated cellulose product prior to the acid treatment, then the sulphuric acid excess should be sufficient to convert that 45% of the copper to copper sulphate. There is also added on the drum 26 a sufficient amount of water to wash the acid-treated product free of the aforementioned chemicals. The acid and water wash liquors from the drum 26 are caught in a tank or trough 27 where they are intimately mixed and passed to a mixing tank 28.

The acid wash liquor delivered to the tank 28 contains excess sulphuric acid, sodium sulphate, copper sulphate and ammonium sulphate. The dehydrated copper oxide and copper hemicellulose complex obtained from the centrifuge or filter 19 is added to the acid wash liquor in the tank 28, and the excess sulphuric acid reacts with these copper compounds to form copper sulphate and hemicellulose is precipitated. The liquor or solution from the tank 28 is passed to a continuous filter 29 for removing the precipitated hemicellulose. If there is any free acid in the solution leaving the tank 28, it should be neutralized by the addition of sodium hydroxide to form sodium sulphate before the solution is filtered. Control of the acid used on the drum 26 will, however, eliminate the necessity of such sodium hydroxide addition.

The dilute filtered solution from the filter 29, containing copper sulphate, sodium sulphate and ammonium sulphate, is now passed by a pump 30 through a heat-exchanger 31 to a triple effect evaporator 32. The evaporation may be carried out in either a single or multiple effect evaporator, the selection of this equipment being based on operating economy. The flow of solution through the evaporator is in accordance with standard practice. The amount of evaporation carried out is sufficient to give a concentrated solution leaving the evaporator of from 5 to 7% copper. The concentrated solution from the evaporator passes through a heat exchanger 33 and is then reacted with ammonia, recovered from the process, to form copper tetrammino sulphate. In the heat-exchanger 31, the dilute solution passing to the evaporator 32 is in heat-exchange relationship with the exhaust heating medium of the evaporator, and in the heat-exchanger 33 the concentrated solution from the evaporator is in heat-exchange relationship with water wash liquor used on the reel or drum 34 for the final washing of the regenerated cellulose product after the acid treatment. This final water wash liquor is caught in a tank or trough 35, and after passing through the heat-exchanger 33 is utilized in the hot water wash of the regenerated cellulose product on the drum 8.

The reaction of the copper sulphate (in the concentrated solution from the evaporator 32) with ammonia and air to form copper tetrammino sulphate is preferably carried out in a two-stage process, in the first stage of which basic copper sulphate and ammonium sulphate are formed and in the second stage of which the products formed in the first stage are converted to copper tetrammino sulphate in the presence of metallic copper, the contact of the reacting liquor with the metallic copper being sufficient to allow only an amount of ammonium sulphate equivalent to that formed during the acid treatment on the drum 26 to react with the metallic copper (in the presence of ammonia and air) to form copper tetrammino sulphate. As shown in the drawing, this two-stage process is carried out in two towers 36 and 37. Ammonia and air enter the base of the tower 37 and travel upwardly through the two towers in countercurrent to the downward flow of liquid therethrough. The ammonia for this purpose is recovered in the system as follows: The ammonia given off over the spin bath area and the first water wash area (drum 8) is collected by the exhaust system 4 and withdrawn by means of a suitable fan. The amount of ammonia collected at this point will be only approximately 5 to 10% of the recoverable ammonia in the system, whereas for the production of copper tetrammino sulphate there is required from 50 to 75% of the total ammonia used in preparing the cuprammonium-cellulose solution. Since only from 25 to 50% of the ammonia is required as ammonium hydroxide, only a part of the condensate from the evaporator 12 need be further concentrated in the still 14, and the remainder of the condensate can be removed from the condenser 13, a stream of air passed through it to remove the ammonia and the resulting vapors then conveyed to the tower 37. Some ammonia, approximately 5%, is lost, and this is made up from a supply of fresh anhydrous ammonia and may be introduced into the tower 37 along with the recovered ammonia.

The concentrated copper sulphate solution or liquor is conveyed by a pump 38 from the heat-exchanger 33 to the top of the tower 36. The solution entering the tower 36 although containing no free acid has an acid reaction as a result of the presence of copper sulphate. All of the ammonia in the tower 36 is reacted with the copper sulphate with the formation of basic copper sulphate and ammonium sulphate, and in consequence ammonia-free air is exhausted from the top of the tower. The solution passes from the bottom of the tower 36 to a tank 39, and part of the solution is recirculated through the tower by means of a pump 40 in order to maintain a sufficient volume of liquid flow through the tower. A portion of the solution equivalent to the amount entering the tower 36 from the heat-exchanger 33 is continuously withdrawn from the tank 39 by means of a pump 41 and is conveyed to the top of the tower 37. The solution entering the top of the tower 37 contains basic copper sulphate formed in the tower 36, ammonium sulphate formed in the tower 36 as well as ammonium sulphate formed by the acid treatment of the regenerated cellulose product on the reel 26, and sodium sulphate. In the tower 37, the solution flows over metallic copper in the presence of the ascending gaseous stream of ammonia and air. The rate of flow of the solution over the metallic copper in the tower 37 is sufficient to allow only an amount of ammonium sulphate equivalent to the ammonium sulphate formed by the aforementioned acid treatment on the reel 26 to react with the metallic copper to form copper tetrammino sulphate. This reaction takes place very readily in the presence of ammonia and air. The remainder of the ammonium sulphate and the basic copper sulphate react with ammonia in the tower 37 to form copper tetrammino sulphate.

The reaction in the tower 36 may be represented by the following equation:

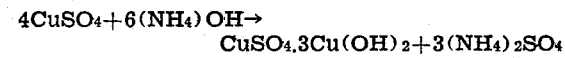

$$4CuSO_4 + 6(NH_4)OH \rightarrow CuSO_4 \cdot 3Cu(OH)_2 + 3(NH_4)_2SO_4$$

The conversion to copper tetrammino sulphate of the amount of ammonium sulphate permitted to react with metallic copper in the tower 37 may be represented by the following equation:

$$(NH_4)_2SO_4 + 2NH_3 + Cu + O \rightarrow Cu(NH_3)_4SO_4 + H_2O$$

Basic copper sulphate and the remaining ammonium sulphate react with ammonia in the tower 37 to produce copper tetrammino sulphate in accordance with the following equation:

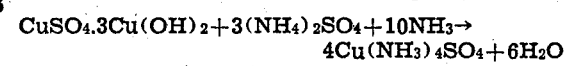

$$CuSO_4 \cdot 3Cu(OH)_2 + 3(NH_4)_2SO_4 + 10NH_3 \rightarrow 4Cu(NH_3)_4SO_4 + 6H_2O$$

The copper tetrammino sulphate formed in the tower 37 may contain a very slight amount of ammoniacal complex of copper hydroxide, the presence of which does not adversely affect its utilization in the preparation of cuprammonium-cellulose solutions. The use of an ammoniacal copper sulphate solution in the preparation of cuprammonium-cellulose solutions is not limited to the theoretical composition of $Cu(NH_3)_4SO_4$, but may contain an excess of ammonia as described in the aforementioned patent. This fact greatly simplifies the recovery process, since, as adjustments for the ammonia content of the cuprammonium-cellulose solution may be made, the copper tetrammino sulphate may contain as much as 2.5 mols excess ammonia.

While it is our preferred practice to recover the copper as copper tetrammino sulphate, the copper may be recovered as copper sulphate by omitting the treatment of the concentrated copper sulphate solution in the ammonia towers 36 and 37. When the copper is recovered as copper sulphate, the ammonia will be separately recovered, and the two agents may then be utilized in any appropriate manner for the preparation of fresh cuprammonium-cellulose solutions.

In its preferred and complete form, the invention provides an economical recovery of chemicals in a simple and effective manner. While it is preferable to combine and coordinate the two aspects (alkaline recovery and acid recovery) of the invention as hereinbefore described, either the alkaline recovery aspect or the acid recovery aspect of the invention may be separately practiced. A characteristic feature of the alkaline recovery aspect of the invention is the mixing of the spent setting bath with the water wash liquor and the subsequent treatment of the mixture to recover ammonia, copper oxide and sodium hydroxide or equivalent chemical used in the setting bath, and, if desired, removing and recovering sodium sulphate.

A characteristic feature of the acid recovery aspect of the invention is the adjustment of the composition of the acid wash liquor to neutralize any free acid and so that all of the copper present is in the form of copper sulphate. This feature of the invention is most advantageously accomplished by coordinating the alkaline and acid recovery aspects whereby the recovered copper oxide is added to the acid wash liquor in the presence of sufficient sulphuric acid to convert all of the copper present to copper sulphate. Furthermore, by coordinating the two aspects of the invention the recovered ammonia may be advantageously utilized to form copper tetrammino sulphate, and cellulosic impurities (hemicelluloses) in the spent setting bath may be conveniently removed.

We claim:

1. In the cuprammonium process in which a regenerated cellulose product is formed in a sodium hydroxide setting bath and then successively washed with water and dilute sulphuric acid, the improvement in reagent recovery which comprises mixing the water wash liquor with spent setting bath, heating said mixture to drive off ammonia and to form copper oxide in a solution of sodium hydroxide, separating the copper oxide from the solution of sodium hydroxide and utilizing the latter solution for the preparation of fresh setting bath, and mixing said separated copper oxide with the acid wash liquor obtained in washing with dilute sulphuric acid in the presence of sufficient sulphuric acid to convert all of the copper present to copper sulphate, whereby the sulphuric acid in the acid wash liquor is utilized in the reaction with the copper oxide.

2. In the cuprammonium process in which a regenerated cellulose product is formed in a circulating sodium hydroxide setting bath and then successively washed with water and dilute sulphuric acid, the improvement in reagent recovery which comprises mixing the water wash liquor with the overflow of the setting bath, heating said mixture to drive off ammonia and to form copper oxide in a solution of sodium hydroxide, separating the copper oxide from the solution of sodium hydroxide and ultimately returning the sodium hydroxide to the setting bath, mixing said separated copper oxide with the acid wash liquor obtained in washing with dilute sulphuric acid in the presence of sufficient sulphuric acid to convert all of the copper present to copper sulphate, withdrawing a mixture of air and ammonia gas from the atmosphere surrounding the setting bath and the water wash and reacting said copper sulphate with ammonia including the ammonia driven off and the ammonia of the mixture of air and ammonia to form copper tetrammino sulphate, whereby the ammonia driven off and the ammonia recovered from the mixture of air and ammonia is utilized.

3. In the cuprammonium process in which a regenerated cellulose product is formed from a cuprammonium-cellulose solution containing sodium sulphate in a sodium hydroxide setting bath and then washed with water, the improvement in reagent recovery which comprises mixing the water wash liquor with spent setting bath, heating said mixture to drive off ammonia and to form copper oxide in a solution of sodium hydroxide, separating the copper oxide from the solution of sodium hydroxide, subjecting said solution of sodium hydroxide which is practically free of copper oxide and copper hydroxide to a sufficiently low temperature to crystallize sodium sulphate therefrom in a substantially copper free state, removing the crystalline sodium sulphate from the residual solution as a product sufficiently free of copper to be commercially useful without further purification, and utilizing said residual solution of sodium hydroxide for the preparation of fresh setting bath.

4. In the cuprammonium process in which a regenerated cellulose product is formed in a setting bath and then successively washed with hot water, dilute sulphuric acid and water, the improvement in reagent recovery which comprises treating spent setting bath and the hot water wash liquor to recover ammonia and copper oxide, mixing the acid wash liquor obtained in washing with dilute sulphuric acid and said recovered copper oxide in the presence of sufficient sulphuric acid to convert all of the copper present to copper sulphate and heating the resulting liquor to drive off water vapor and to increase the copper sulphate content of the residual liquor, passing said hot residual liquor in heat-exchange relationship with the aforementioned final water wash liquor and recovering from the resulting cooled residual liquor copper sulphate for reuse in the cuprammonium process, and utilizing the heated final water wash liquor after its aforementioned heat-exchange treatment in the hot water wash of the regenerated cellulose product.

5. In the cuprammonium process in which a regenerated cellulose product is formed in a sodium hydroxide setting bath, which bath dissolves hemicelluloses and partially removes the copper from the regenerated cellulosic product and the regenerated cellulosic product successively is washed with water and dilute sulphuric acid to remove the remaining copper, the improvement in reagent recovery which comprises mixing the water wash liquor with spent setting bath, heating said mixture to drive off ammonia and water vapor and to form copper oxide and insoluble complexes of copper and cellulose in a relatively concentrated solution of sodium hydroxide, separating said concentrated solution of sodium hydroxide from said copper oxide and copper cellulose complexes, mixing the acid wash liquor obtained in washing with dilute sulphuric acid with said copper oxide and copper cellulose complexes in the presence of sufficient sulphuric acid to convert all the copper to copper sulphate whereby the undissolved cellulosic impurities are precipitated in the resulting liquor, and separating copper sulphate from the resultant liquor for reuse in the cuprammonium process.

6. In the cuprammonium process in which a regenerated cellulose product is formed in a sodium hydroxide setting bath and then successively washed with water and dilute sulphuric acid, the improvement in reagent recovery which comprises mixing the water wash liquor with spent setting bath, heating said mixture to drive off ammonia and water vapor and to form copper oxide in a relatively concentrated solution of sodium hydroxide, separating said concentrated solution of sodium hydroxide from said copper oxide and any accompanying cellulosic impurities, mixing the acid wash liquor obtained in washing with dilute sulphuric acid with said copper oxide and accompanying cellulosic impurities in the presence of sufficient sulphuric acid to convert all of the copper present to copper sulphate and treating the resulting liquor to remove the cellulosic impurities therefrom, and recovering copper sulphate from the so-treated liquor for reuse in the cuprammonium process.

7. In the cuprammonium process in which a regenerated cellulose product is formed from a cuprammonium-cellulose solution containing sodium sulphate in a sodium hydroxide setting bath and then successively washed with water and dilute sulphuric acid, the improvement in reagent recovery which comprises mixing the water wash liquor with spent setting bath, heating said mixture to drive off ammonia and water vapor and to form copper oxide in a relatively concentrated solution of sodium hydroxide, separating said concentrated solution of sodium hydroxide from said copper oxide and any accompanying cellulosic impurities, subjecting the resulting concentrated solution of sodium hydroxide to a sufficiently low temperature to crystallize sodium sulphate therefrom and removing the crystalline sodium sulphate from the residual solution, utilizing said residual solution of sodium hydroxide for the preparation of fresh setting bath, mixing the acid wash liquor with said copper oxide and accompanying cellulosic impurities in the presence of sufficient sulphuric acid to convert all of the copper present to copper sulphate and treating the resulting liquor to remove the cellulosic impurities therefrom, and bringing the copper sulphate in the so-treated liquor into intimate contact with sufficient ammonia, including ammonia recovered as aforementioned, to form copper tetrammino sulphate.

8. In the cuprammonium process in which a regenerated cellulose product is formed in a sodium hydroxide setting bath and then successively washed with water and dilute sulphuric acid, the improvement in reagent recovery which comprises mixing the water wash liquor with spent setting bath, heating said mixture to drive off ammonia and water vapor and to form copper oxide in a relatively concentrated solution of sodium hydroxide, separating said concentrated solution of sodium hydroxide from said copper oxide and any accompanying cellulosic impurities, mixing the acid wash liquor with said copper oxide and accompanying cellulosic impurities in the presence of sufficient sulphuric acid to convert all of the copper present to copper sulphate and treating the resulting liquor to remove the cellulosic impurities therefrom, heating the so-treated liquor to drive off water vapor and to increase the copper sulphate content of the residual liquor, bringing the copper sulphate in said residual liquor into intimate contact with ammonia to convert the copper sulphate to basic copper sulphate and to form ammonium sulphate and maintaining the liquor including the basic copper sulphate and the ammonium sulphate in intimate contact with ammonia and oxygen, in the presence of metallic copper, for a length of time sufficient to convert substantially all of the basic copper sulphate to copper tetrammino sulphate, but sufficient to convert only that amount of ammonium sulphate originally present in the acid wash liquor to copper tetrammino sulphate.

9. In the cuprammonium process in which a regenerated cellulose product is formed from a cuprammonium-cellulose solution containing sodium sulphate in a circulating sodium hydroxide setting bath and then successively washed with water and dilute sulphuric acid, the improvement which comprises withdrawing a mixture of air and ammonia gas from the atmosphere surrounding the setting bath and water wash, recovering from the acid washing operation a solution containing copper sulphate, sodium sulphate and ammonium sulphate, forming basic copper sulphate and ammonium sulphate by the action of ammonia on the said solution, mixing the solution containing basic copper sulphate and ammonium sulphate in the presence of metallic copper with the mixture of air and ammonia to form copper tetrammino sulphate, thereby separating the ammonia from the air.

10. In the cuprammonium process in which a regenerated cellulose product is formed from a cuprammonium-cellulose solution containing sodium sulphate in a circulating sodium hydroxide setting bath and then successively washed with water and dilute sulphuric acid, the improvement which comprises withdrawing a mixture of air and ammonia gas from the atmosphere surrounding the setting bath and water wash, recovering from the acid washing operation a solution containing copper sulphate and sodium sulphate, forming basic copper sulphate and ammonium sulphate by the action of ammonia on the said solution, mixing the solution containing basic copper sulphate and ammonium sulphate with the mixture of air and ammonia to form copper tertammino sulphate, thereby separating the ammonia from the air.

11. In the cuprammonium process in which a regenerated cellulose product is formed in a sodium hydroxide setting bath and then washed with water, the improvement in reagent recovery which comprises removing spent liquor from the setting bath containing copper hydroxide, sodium hydroxide, ammonia and hemicellulose, heating the spent setting bath liquor to drive off ammonia and to form copper oxide and copper cellulose complexes in the solution of sodium hydroxide, separating the copper oxide and copper cellulose complexes from the solution of sodium hydroxide, mixing the copper oxide and copper cellulose complexes with a solution of sulphuric acid including sulphuric acid from an acid washing of the regenerated cellulose to convert all the copper to copper sulphate, and removing the undissolved cellulosic materials of the complex from the solution.

12. In the cuprammonium process in which a regenerated cellulose product is formed in an alkaline setting bath and then successively washed with water and dilute sulphuric acid, the improvement in reagent recovery which comprises mixing the spent setting bath and the water wash liquor, heating the resulting liquor at a sufficiently high temperature and for a sufficient period of time to cause ammonia to be driven off and copper contained therein to be precipitated as copper oxide, separately recovering the ammonia and precipitated copper oxide, and mixing recovered copper oxide with the acid wash liquor in the presence of an amount of sulphuric acid sufficient to convert all of the copper present in a form other than the sulphate to a solution of copper sulphate, but insufficient to leave an excess of sulphuric acid.

13. In the cuprammonium process in which a regenerated cellulose product is formed in an alkaline setting bath and then successively washed with water and dilute sulphuric acid, the improvement in reagent recovery which comprises mixing the spent setting bath and the water wash liquor, heating the resulting liquor at a sufficiently high temperature and for a sufficient period of time to cause ammonia to be driven off and copper contained therein to be precipitated as copper oxide, separately recovering the ammonia and precipitated copper oxide, mixing recovered copper oxide with the acid wash liquor in the presence of an amount of sulphuric acid sufficient to convert all of the copper present in a form other than the sulphate to a solution of copper sulphate, but insufficient to leave an excess of sulphuric acid, reacting the solution of copper sulphate with ammonia to form basic copper sulphate, and reacting the basic copper sulphate in the presence of metallic copper and oxygen with ammonium sulphate and ammonia to form copper tetrammino sulphate.

14. In the cuprammonium process in which a regenerated cellulose product is formed in an alkaline setting bath and then successively washed with water and dilute sulphuric acid, the improvement in reagent recovery which comprises mixing the spent setting bath and the water wash liquor, heating the resulting liquor at a sufficiently high temperature and for a sufficient period of time to cause ammonia to be driven off and copper contained therein to be precipitated as copper oxide, separately recovering the ammonia and precipitated copper oxide, and mixing recovered copper oxide with the acid wash liquor in the presence of an amount of sulphuric acid sufficient to convert all of the copper present in a form other than copper sulphate to copper sulphate, bringing the copper sulphate present in the resulting liquor into intimate contact with ammonia, including ammonia recovered as aforementioned, to form basic copper sulphate and ammonium sulphate, and maintaining the liquor including the basic copper sulphate and the ammonium sulphate in intimate contact with ammonia and oxygen, in the presence of metallic copper, for a length of time sufficient to convert substantially all of the basic copper sulphate to copper tetrammino sulphate, but sufficient to convert substantially only an amount of ammonium sulphate equal to that present in the acid wash liquor to copper tetrammino sulphate.

15. In the cuprammonium process in which a regenerated cellulose product is formed in an alkaline setting bath with partial removal of copper and subsequently washed with dilute sulphuric acid to remove the remainder of the copper, the improvement in reagent recovery which comprises heating the spent setting bath to a sufficiently high temperature and for a sufficient period of time to drive off ammonia and to precipitate a copper compound, separately recovering the ammonia and the precipitated copper compound, mixing the recovered precipitated copper compound with the acid wash liquor to cause reaction between the copper compound and the sulphuric acid of the acid wash liquor with resulting formation of copper sulphate, the amount of sulphuric acid used in the acid wash liquor being such as to convert all recovered copper compound subsequently mixed with the acid wash liquor to copper sulphate without an excess of sulphuric acid remaining in the liquor in which said reaction takes place, and bringing the copper sulphate into intimate contact with the recovered ammonia to form copper tetrammino sulphate.

16. In the cuprammonium process in which a regenerated cellulose product is formed in a sodium hydroxide setting bath and washed with water while still in the alkaline stage, with partial removal of copper, and subsequently washed with dilute sulphuric acid to remove the remaining copper, the improvement in reagent recovery which comprises precipitating a copper compound from the spent setting bath, recovering the precipitated copper compound, mixing the recovered copper compound with the acid wash liquid to cause reaction between the copper compound and the sulphuric acid of the acid wash liquor with resulting formation of copper sulphate, the amount of sulphuric acid used in the acid wash being such as to convert to copper sulphate all the copper compound left in the regenerated cellulose product after the water wash and the recovered copper compound subsequently added to the acid wash liquor, without an excess of sulphuric acid remaining in the liquor in which the recovered copper compound is converted to copper sulphate, withdrawing a mixture of air and ammonia gas from the atmosphere surrounding the setting bath, bringing the copper sulphate formed as aforementioned into intimate contact with ammonia, including ammonia in said withdrawn ammonia and air mixture, to form basic copper sulphate and ammonium sulphate, and intimately contacting the basic copper sulphate and ammonium sulphate thus formed with more ammonia and air to form copper tetrammino sulphate.

17. In the cuprammonium process in which a regenerated cellulose product is formed in an alkaline setting bath with partial removal of copper, and further amounts of copper subsequently are removed by initially washing with hot water, then by washing with dilute sulphuric acid and finally by washing with water, the improvement in reagent recovery which comprises precipitating a copper compound from the spent setting bath, recovering the precipitated copper compound, mixing the recovered copper compound with the acid wash liquor to cause reaction between the recovered copper compound and the sulphuric acid of the acid wash liquor with resulting formation of copper sulphate, the amount of sulphuric acid used in the acid wash being such as to convert to copper sulphate all of the copper compound left in the regenerated cellulose after the water wash and the recovered copper compound subsequently added to the acid wash liquor, without an excess of sulphuric acid remaining in the liquor in which the recovered copper compound is converted to copper sulphate, heating said liquor containing the copper sulphate to drive off water vapor and to increase the concentration of copper sulphate in the residual liquor, passing said hot residual liquor in heat-exchange relation with the final water wash liquor, then passing the heated final water wash liquor to the initial water wash stage for use therein, bringing said concentrated residual liquor, after having been brought in heat-exchange relationship with said final water wash liquor, into intimate contact with ammonia to convert the copper sulphate thereof to basic copper sulphate and to form ammonium sulphate, and then bringing the basic copper sulphate and the ammonium sulphate thus formed into intimate contact with more ammonia to form copper tetrammino sulphate.

18. In the cuprammonium process in which a regenerated cellulose product is formed in a setting bath with partial removal of copper and then successively washed with water and dilute sulphuric acid to remove the remainder of the copper, the improvement in reagent recovery which comprises mixing the spent setting bath and the waste water wash liquor, heating the resulting mixture to a sufficiently high temperature and for a sufficient period of time to drive off ammonia and to precipitate copper therefrom as copper oxide, separately recovering the ammonia and the copper oxide, mixing the recovered copper oxide and the acid wash liquor obtained in washing with dilute sulphuric acid, said acid wash liquor containing copper sulphate, sodium sulphate and sufficient residual acid to convert all the copper oxide to copper sulphate and bringing the resulting liquor containing the copper sulphate and the sodium sulphate into intimate contact with ammonia, including said recovered ammonia to form copper tetrammino sulphate.

19. In a cuprammonium process in which a regenerated cellulose product is formed in an alkaline setting bath and then successively washed with water and dilute sulphuric acid, the improvement in reagent recovery which comprises heating the spent setting bath at a sufficiently high temperature and for a sufficient period of time to cause ammonia to be driven off and copper contained therein to be precipitated as copper oxide, separately recovering the ammonia and precipitated copper oxide, and mixing recovered copper oxide with the acid wash liquor in the presence of an amount of sulphuric acid sufficient to convert all of the copper present in a form other than copper sulphate to copper sulphate, bringing the copper sulphate present in the resulting liquor into intimate contact with ammonia, including ammonia recovered as aforementioned, to form basic copper sulphate and ammonium sulphate, and maintaining the liquor including the basic copper sulphate and the ammonium sulphate in intimate contact with ammonia and oxygen, in the presence of metallic copper, for a length of time sufficient to convert substantially all of the basic copper sulphate to copper tetrammino sulphate, but sufficient to convert substantially only an amount of ammonium sulphate equal to that present in the acid wash liquor to copper tetrammino sulphate.

20. In the cuprammonium process in which a regenerated cellulose product is formed in a sodium hydroxide setting bath and then successively washed with water and dilute sulphuric acid with resultant production of an acid liquor containing copper sulphate and ammonium sulphate; the improvement in reagent recovery which comprises mixing the spent setting bath and the water wash liquor, heating the resulting liquor to a sufficiently high temperature for a sufficient period of time to cause ammonia to be driven off and copper contained therein to be precipitated as copper oxide, separately recovering the ammonia and the precipitated copper oxide, mixing the recovered copper oxide with the acid wash liquor in the presence of sufficient sulphuric acid to convert all copper present in a form other than the sulphate to copper sulphate, heating the resulting liquor to drive off water and to increase the concentration of copper sulphate in the residual liquor, bringing the residual liquor into intimate contact with ammonia, including ammonia recovered as aforementioned, to form basic copper sulphate and ammonium sulphate and bringing the resulting liquor containing the basic copper sulphate and the ammonium sulphate into intimate contact with ammonia and oxygen, in the presence of metallic copper, and maintaining it in contact with the ammonia and oxygen, in the presence of metallic copper, for a length of time sufficient to convert substantially all of the basic copper sulphate to copper tetrammino sulphate, but sufficient to convert substantially only an amount of ammonium sulphate equal to that present in the acid wash liquor to copper tetrammino sulphate.

21. In the cuprammonium process in which a regenerated cellulose product is formed from a cuprammonium cellulose solution containing sodium sulphate in an alkaline setting bath and washed, first with hot water, then with dilute sulphuric acid to decopper it and finally with water, and the spent setting bath and the hot water wash liquor utilized for forming copper sulphate for use in regenerating fresh cuprammonium cellulose solution, the improvement which comprises substantially continuously precipitating the copper from the spent setting bath and the water wash liquor in the form of copper oxide, separating the precipitated copper oxide, mixing the separated precipitated copper oxide with the acid wash liquor to convert the copper oxide to copper sulphate, the amount of sulphuric acid present in the acid wash liquor during any period of operation being such that after decoppering the regenerated cellulose product sufficient sulphuric acid remains in the acid wash liquor to convert substantially all of the copper oxide precipitated from the water wash liquor and the spent setting bath during such period to copper sulphate without leaving any appreciable excess of sulphuric acid in the solution in which the copper sulphate is formed as aforementioned.

PAUL HENRY SCHLOSSER.
JOHN WALTER BENNETT.
KENNETH RUSSELL GRAY.